(12) United States Patent
Cain

(10) Patent No.: US 6,871,235 B1
(45) Date of Patent: Mar. 22, 2005

(54) FAST PATH FORWARDING OF LINK STATE ADVERTISEMENTS USING REVERSE PATH FORWARDING

(75) Inventor: Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/458,403

(22) Filed: Dec. 10, 1999

(51) Int. Cl.⁷ .............................................. G06F 9/00
(52) U.S. Cl. .................. 709/239; 709/238; 709/240; 370/350
(58) Field of Search ............................. 709/238, 239, 709/240, 241; 370/351

(56) References Cited

U.S. PATENT DOCUMENTS

| | | | | |
|---|---|---|---|---|
| 4,864,559 A | * | 9/1989 | Perlman | 370/60 |
| 5,331,637 A | * | 7/1994 | Francis et al. | 370/54 |
| 5,917,820 A | * | 6/1999 | Rehkter | 370/392 |
| 6,252,856 B1 | * | 6/2001 | Zhang | 370/254 |
| 6,331,983 B1 | * | 12/2001 | Haggerty et al. | 370/400 |

OTHER PUBLICATIONS http://www.faqs.org/rfcs/rfc2362.html, D. Estrin et al, RFC 2362, Jun. 1998.*

* cited by examiner

Primary Examiner—Rupal Dharia
Assistant Examiner—Adnan M Mirza
(74) Attorney, Agent, or Firm—Steubing McGuiness & Manaras LLP

(57) ABSTRACT

A link state advertisement protocol message received from an originating device over an inbound interface is forwarded over the fast path according to a reverse path forwarding determination. Specifically, a reverse path forwarding check is performed in order to determine the reverse path forwarding interface for the originating device. A forwarding state that indicates the reverse path forwarding interface may be installed, in which case the forwarding state may be used to determine the reverse path forwarding interface. If the inbound interface is determined to be the reverse path forwarding interface for the originating device, then the link state advertisement protocol message is forwarded over the fast path. Otherwise, the link state advertisement protocol message is not forwarded over the fast path. The link state advertisement protocol message continues to be processed and forwarded by the control plane as usual for robustness.

25 Claims, 9 Drawing Sheets

FAST PATH FORWARDING OF LINK STATE ADVERTISEMENTS USING REVERSE PATH FORWARDING

CROSS-REFERENCE TO RELATED APPLICATIONS

The present invention may be related to the following commonly-owned United States patent applications, which are hereby incorporated by reference in their entireties:

U.S. patent application Ser. No. 09/458,402 entitled FAST PATH FORWARDING OF LINK STATE ADVERTISEMENTS, filed on even date herewith in the name of Bradley Cain U.S. patent application Ser. No. 09/460,321 entitled FAST PATH FORWARDING OF LINK STATE ADVERTISEMENTS USING A MINIMUM SPANNING TREE, filed on even date herewith in the name of Bradley Cain; and U.S. patent application Ser. No. 09/460,341 entitled FAST PATH FORWARDING OF LINK STATE ADVERTISEMENTS USING MULTICAST ADDRESSING, filed on even date herewith in the name of Bradley Cain.

FIELD OF THE INVENTION

The present invention relates generally to communication systems, and more particulary to propagating link state advertisements in a communication network.

BACKGROUND OF THE INVENTION

In today's information age, it is typical for computers to be internetworked over a communication network. A common networking model uses a number of interconnected routers to route protocol messages (referred to hereinafter as packets) within the communication network. A router acts as a gateway between two or more network segments, and processes packets according to addressing information contained in the packets.

When a router receives a packet from a particular network segment, the router determines whether to drop the packet, process the packet, or forward the packet. Specifically, the router may drop the packet if the packet is destined for the same network segment from which it was received. The router may forward the packet if the packet is destined for a different network segment. The router may process the packet if the packet is destined for the router itself. For convenience, the router logic that forwards packets is referred to as the "fast path" of the router, while the router logic that processes packets is referred to as the "control plane" of the router.

In order for the fast path to forward packets, the router uses a routing protocol to determine network routes, and uses the network routes to build and maintain a forwarding table. The forwarding table includes forwarding entries mapping each destination address to a corresponding router interface based upon the network routes.

There are many different routing protocols in common use. One type of routing protocol, known as a "link state" routing protocol, an example of which is the Open Shortest Path First (OSPF) routing protocol, requires each router in the communication network to maintain a topology database describing the topology of the communication network. The topology database identifies each router in the communication network and the status of each router's links to other routers. Each router uses the topology information from its topology database to determine the network routes, typically using a shortest-path first technique for determining the network routes. The topology information, and therefore the forwarding table, is updated as network routes change.

In order for each router to maintain a topology database, each router must receive link state information from each of the other routers in the communication network. Therefore, each router sends link state advertisement (LSA) protocol messages to the other routers in the communication network indicating the status of each communication link maintained by the router. Typically, each router sends a LSA protocol message whenever the status of a communication link changes, and also sends a LSA protocol message periodically so that new routers receive the link state information in a timely manner. The LSA protocol messages are propagated to each of the other routers in the communication network.

When a router receives a LSA protocol message, the LSA protocol message is processed by the control plane of the router. The control plane updates the topology database according to the link state information in the LSA protocol message, and updates the forwarding table accordingly. The control plane may also forward the LSA protocol message to its neighboring routers.

Unfortunately, this control plane processing by each router can cause significant delay in propagating the LSA protocol messages to all routers in the communication network, especially in large communication networks having many routers. Consequently, there can be significant delay in recovering from network routing changes and outages, resulting in mis-routed packets, dropped packets, and overall performance degradation.

Thus, an improved technique for propagating LSA protocol messages is needed.

SUMMARY OF THE INVENTION

In accordance with one aspect of the invention, LSA protocol messages are forwarded over the fast path according a reverse path forwarding determination. Specifically, upon receiving a LSA protocol message from an originating device over an inbound interface, a determination is made whether the inbound interface is the reverse path forwarding interface for the originating device using a reverse path forwarding check. If the inbound interface is the reverse path forwarding interface for the originating device, then the LSA protocol message is forwarded to all interfaces, other than the inbound interface, by the fast path. If the inbound interface is not the reverse path forwarding interface for the originating device, then the LSA protocol message is not forwarded by the fast path. In either case, the LSA protocol message is preferably routed to the control plane, which processes and forwards the LSA protocol message as usual for robustness.

DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention forwards LSA protocol messages by the fast path according to a predetermined forwarding scheme. This fast path forwarding of LSA protocol messages is done independently of any control plane processing, and therefore avoids the delays caused by the control plane processing. The fast path continues to route all received LSA protocol messages to the control plane as usual so that the control plane can obtain the topology information from the LSA protocol messages. Also the control plane preferably forwards the LSA protocol messages as usual for robustness.

Figure 1:
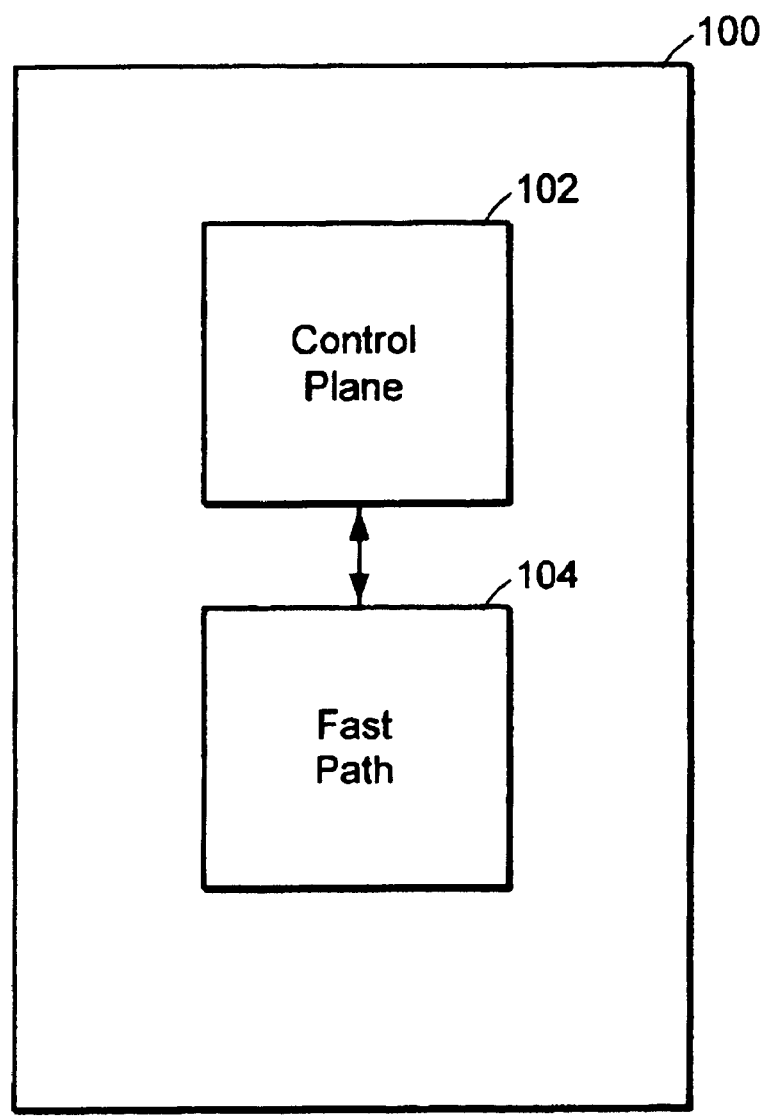
FIG. 1 is a block diagram showing the relevant logic blocks of an exemplary router in accordance with an embodiment of the present invention.

FIG. 1 is a block diagram showing the relevant logic blocks of an exemplary router 100. Among other things, the router includes a control plane 102 and a fast path 104. The fast path 104 performs filtering and forwarding of protocol messages, and routes control messages to the control plane 102. The control plane 102 processes control messages received from the fast path 104, and also sends protocol messages via the fast path 104.

Figure 2:
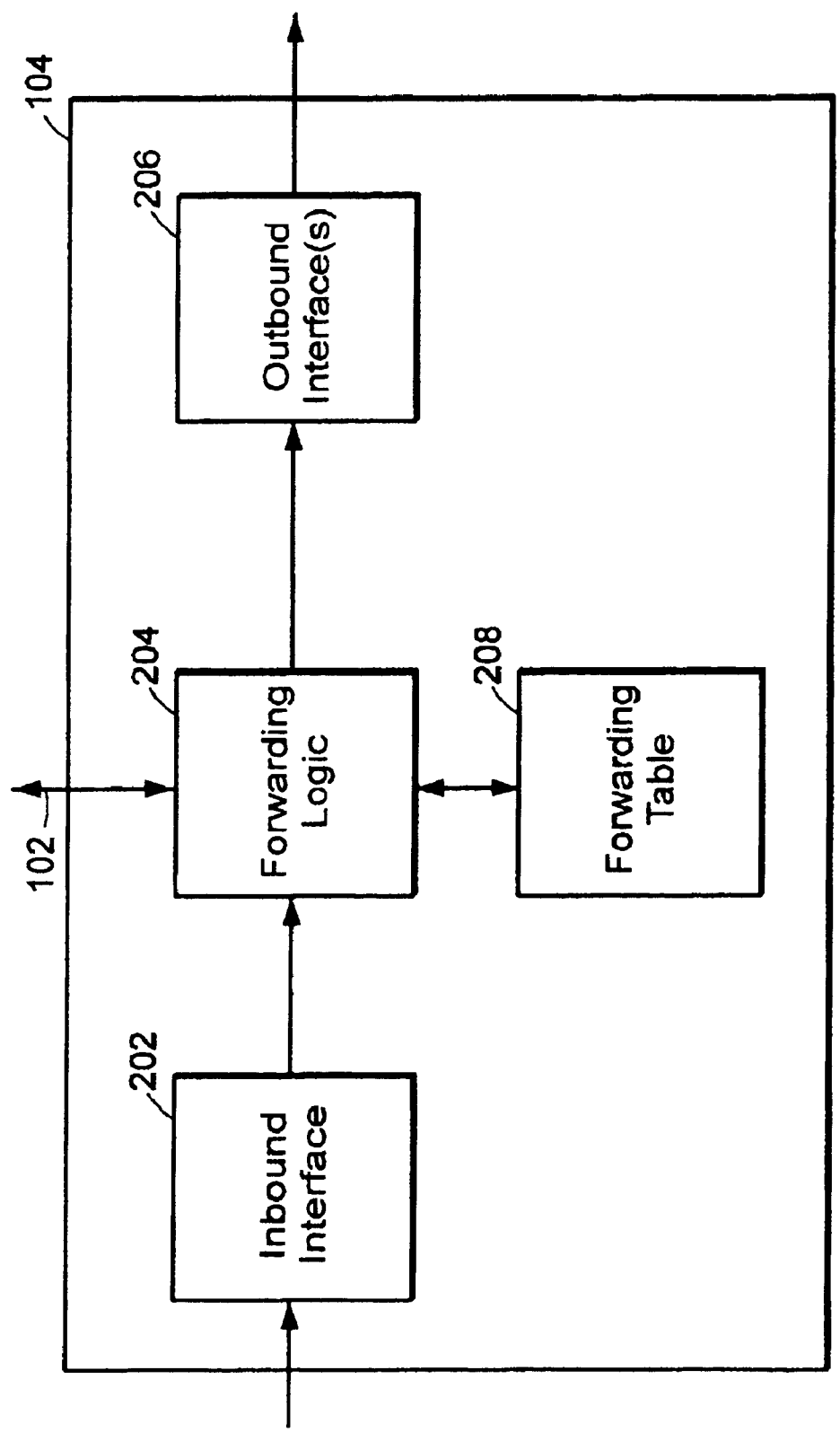
FIG. 2 is a block diagram showing the relevant logic blocks of the fast path in accordance with an embodiment of the present invention.

FIG. 2 is a block diagram showing the relevant logic blocks of the fast path 104. Among other things, the fast path 104 includes an inbound interface 202, forwarding logic 204, outbound interface(s) 206, and a forwarding table 208. The forwarding logic 104 performs packet filtering and forwarding functions based upon, among other things, the forwarding entries in the forwarding table 208. Specifically, upon receiving a packet from the inbound interface 202, the forwarding logic 204 may drop the packet, route the packet to the control plane 102, or forward the packet to the outbound interface(s) 206. Also, upon receiving a packet from the control plane 102, the forwarding logic may forward the packet to the outbound interface(s) 206.

Figure 3:
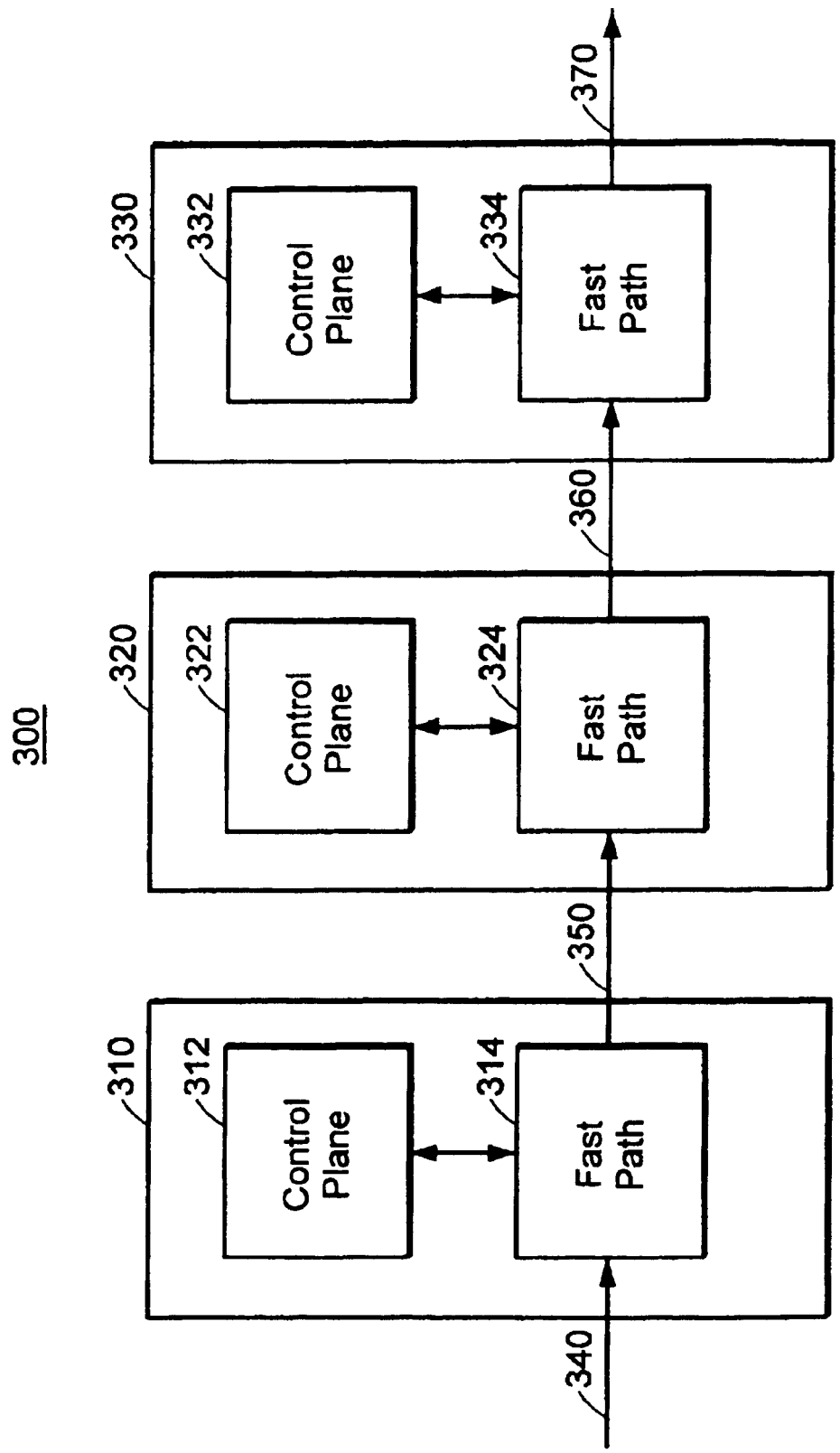
FIG. 3 is a block diagram showing an exemplary communication network in accordance with an embodiment of the present invention.

FIG. 3 is a block diagram showing an exemplary communication network 300 including three (3) interconnected routers, namely router 310, router 320, and router 330. Each router includes a control plane (312, 322, 332) and a fast path (314, 324, 334). Each router is connected to its neighboring router(s) via a fast path connection (340, 350, 360, 370).

Figure 4:
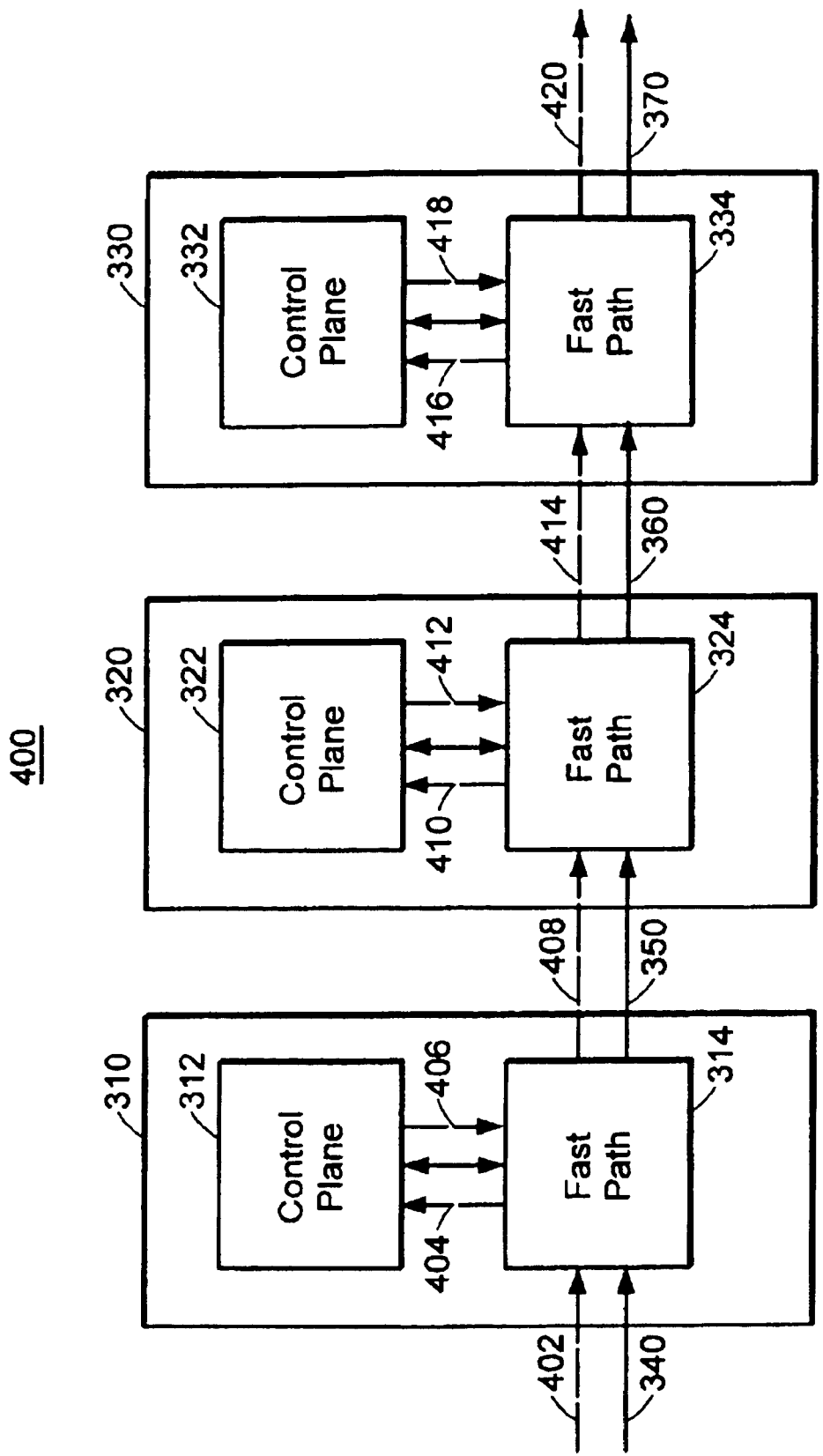
FIG. 4 is a block diagram showing the routing path of a link state advertisement protocol message in accordance with a prior art embodiment.

FIG. 4 shows the routing path of a LSA protocol message in an exemplary communication network 400 including the three (3) interconnected routers 310, 320, and 330. The LSA protocol message is propagated to all routers. Specifically, each router forwards the LSA protocol message to its neighboring router(s). Thus, the router 310 receives the LSA protocol message from its neighboring router, and forwards the LSA protocol message to the router 320. The router 320 receives the LSA protocol message from the router 310, and forwards the LSA protocol message to the router 330. The router 330 receives the LSA protocol message from the router 320, and forwards the LSA protocol message to its neighboring router.

More specifically, upon receiving the LSA protocol message by the router 310 over the routing path 402, the fast path 314, and particularly the forwarding logic of the fast path 314, routes the LSA protocol message to the control plane 312 over the routing path 404. The control plane 312 processes the LSA protocol message. Assuming the control plane 312 decides to forward the LSA protocol message, the control plane 312 forwards the LSA protocol message to the fast path 314 over the routing path 406. The fast path 314, and particularly the forwarding logic of the fast path 314, forwards the LSA protocol message to the router 320 over the routing path 408.

Upon receiving the LSA protocol message by the router 320 over the routing path 408, the fast path 324, and particularly the forwarding logic of the fast path 324, routes the LSA protocol message to the control plane 322 over the routing path 410. The control plane 322 processes the LSA protocol message. Assuming the control plane 322 decides to forward the LSA protocol message, the control plane 322 forwards the LSA protocol message to the fast path 324 over the routing path 412. The fast path 324, and particularly the forwarding logic of the fast path 324, forwards the LSA protocol message to the router 330 over the routing path 414.

Upon receiving the LSA protocol message by the router 330 over the routing path 414, the fast path 334, and particularly the forwarding logic of the fast path 334, routes the LSA protocol message to the control plane 332 over the routing path 416. The control plane 332 processes the LSA protocol message. Assuming the control plane 332 decides to forward the LSA protocol message, the control plane 332 forwards the LSA protocol message to the fast path 334 over the routing path 418. The fast path 334, and particularly the forwarding logic of the fast path 334, forwards the LSA protocol message to its neighboring router(s) over the routing path 420.

The process of routing the LSA protocol message to the control plane and forwarding LSA protocol message by the control plane, in and of itself, causes delays in propagating the LSA protocol message to all routers in the communication network. The amount of processing performed by the control plane only worsens the delays in propagating the LSA protocol message to all routers in the communication network. The amount of processing performed by the control plane can be significant, depending on the routing protocol and certain operational parameters. For example, the control plane processing for an OSPF LSA protocol message includes, among other things, verifying an Internet Protocol (IP) checksum for the LSA protocol message, verifying an OSPF checksum for the LSA protocol message, determining whether the LSA protocol message is intended for the router, determining whether the LSA protocol message is received for the correct network area, determining whether the LSA protocol message is a duplicate of a previously received LSA protocol message, determining whether the LSA protocol message has reached its maximum age, determining outbound interface(s), and determining the status of neighboring routers. When authentication is enabled, the control plane processing for an OSPF LSA protocol message also includes authenticating the LSA protocol message using a MD5 one-way hash function calculation, which adds even more delays in propagating the LSA protocol message to all routers in the communication network.

Therefore, in a preferred embodiment of the present invention, LSA protocol messages are forwarded by the routers over the fast path. In addition to forwarding the LSA protocol messages over the fast path, the routers preferably continue to process and forward the LSA protocol messages by the control plane as usual for robustness.

Figure 5:
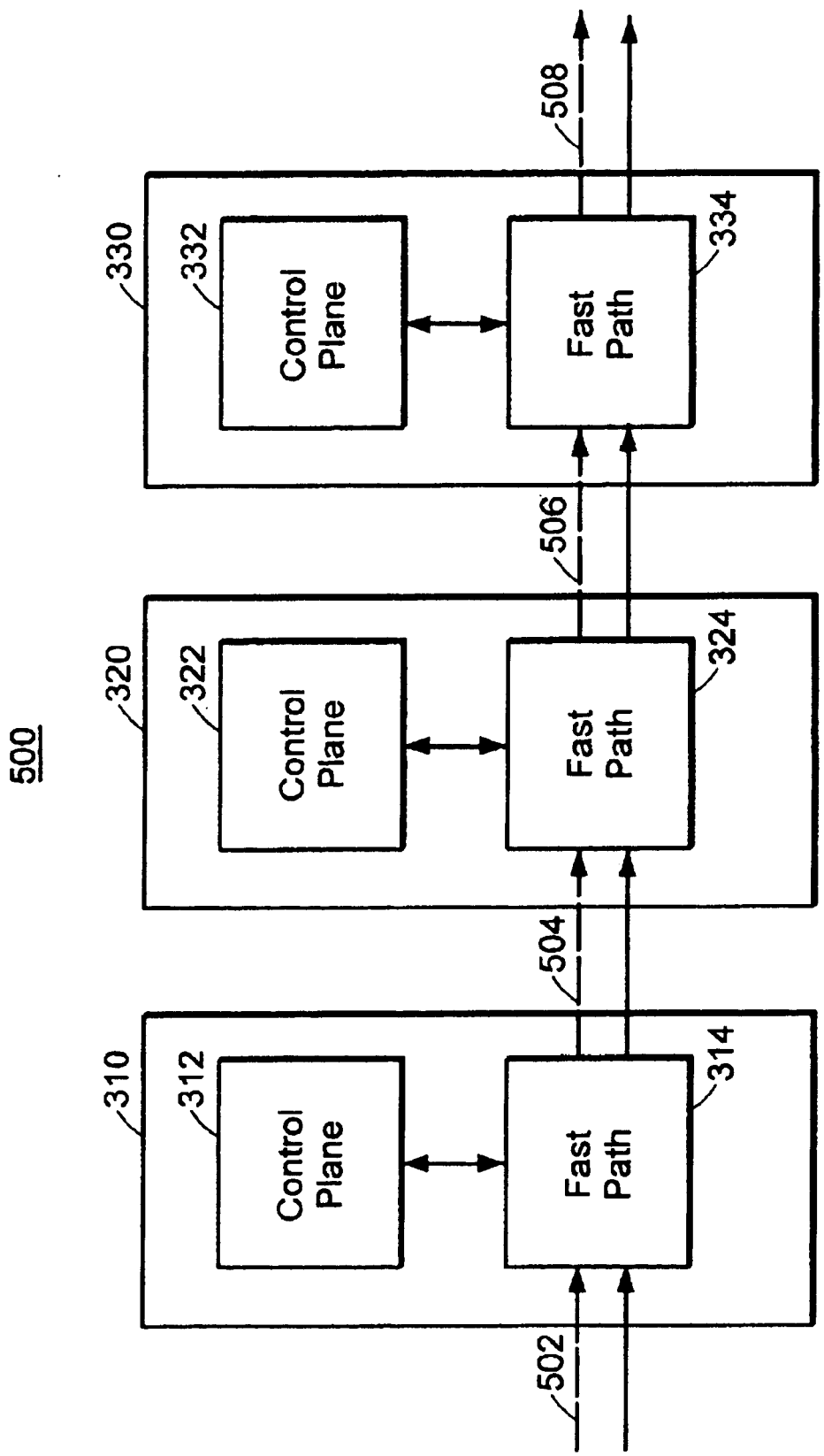
FIG. 5 is a block diagram showing the routing path of a link state advertisement protocol message in accordance with an embodiment of the present invention.

FIG. 5 shows the routing path of a LSA protocol message in an exemplary communication network 500 including the three (3) interconnected routers 310, 320, and 330. The LSA protocol message is propagated to all routers. Specifically, each router forwards the LSA protocol message to its neighboring router(s). Thus, upon receiving the LSA protocol message by the router 310 over the routing path 502, the fast path 314, and particularly the forwarding logic of the fast path 314, routes the LSA protocol message to the router 320 over the routing path 504. Upon receiving the LSA protocol message by the router 320 over the routing path 504, the fast path 324, and particularly the forwarding logic of the fast path 324, routes the LSA protocol message to the router 330 over the routing path 506. Upon receiving the LSA protocol message by the router 330 over the routing path 506, the fast path 334, and particularly the forwarding logic of the fast path 334, routes the LSA protocol message to its neighboring router(s) over the routing path 508.

Figure 6:
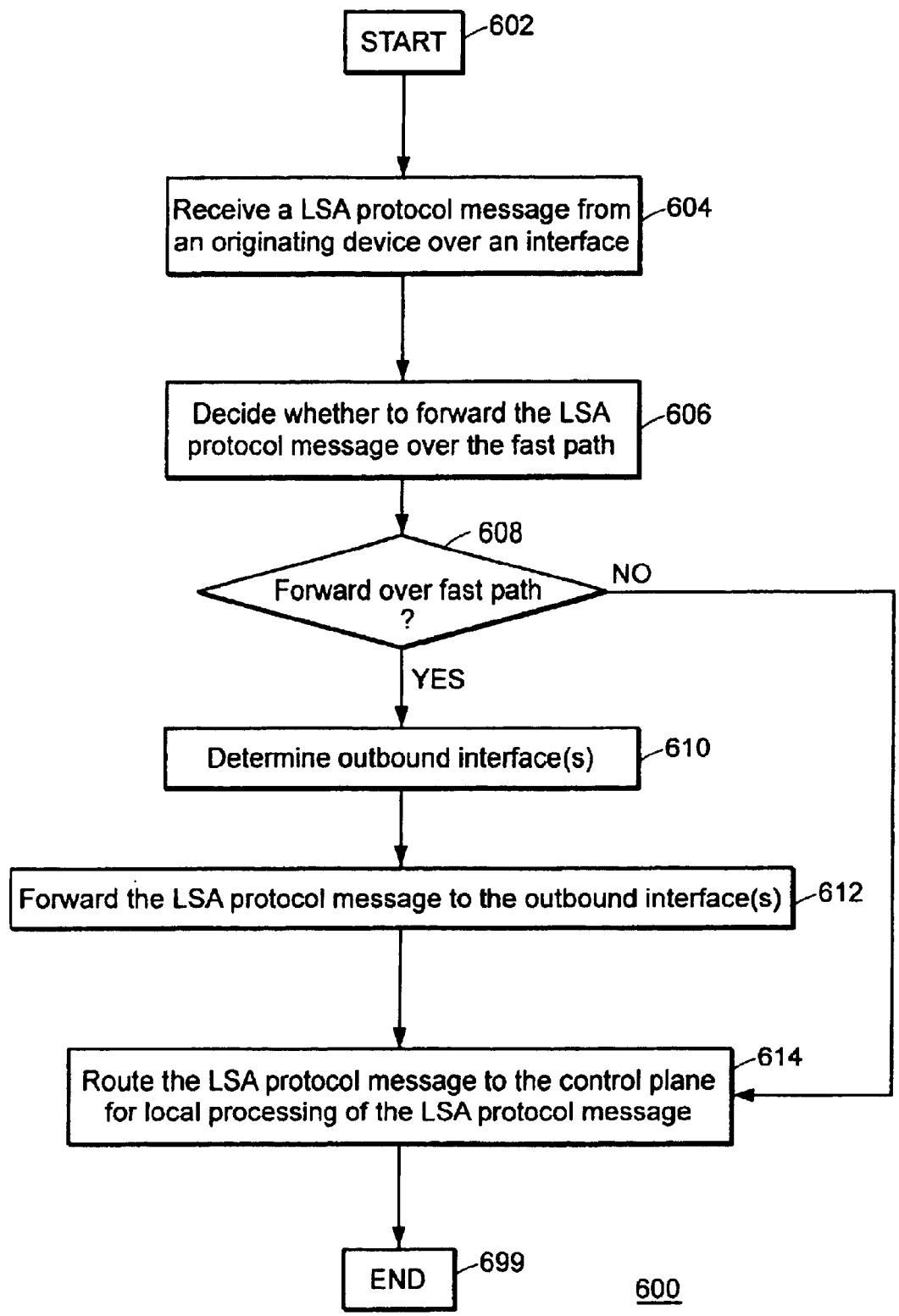
FIG. 6 is a logic flow diagram showing exemplary logic 600 for processing a LSA protocol message in accordance with an embodiment of the present invention.

FIG. 6 is a logic flow diagram showing exemplary logic 600 for processing a LSA protocol message. Beginning at step 602, and upon receiving a LSA protocol message from an originating device over an interface, in step 604, the logic decides whether to forward the LSA protocol message over the fast path, in step 606. If the logic decides to forward the LSA protocol message over the fast path (YES in step 608), then the logic determines the outbound interface(s), in step 610, and forwards the LSA protocol message to the outbound interface(s), in step 612. Whether or not the logic forwards the LSA protocol message over the fast path, the logic routes the LSA protocol message to the control plane for local processing of the LSA protocol message, in step 614. The logic 600 terminates in step 699.

An embodiment of the present invention utilizes a Reverse Path Forwarding (RPF) technique to decide whether or not to forward the LSA protocol message over the fast path (step 606 as shown and described with reference to FIG. 6 above). RPF is a multicasting technique in which a multicast protocol message is forwarded to all interfaces, other than the interface over which the multicast protocol message is received (referred to hereinafter as the inbound interface), if and only if the inbound interface is the preferred inbound interface for the originating device. The preferred inbound interface is typically the "closest" interface to the originating device as determined by a predetermined routing protocol or metric.

An embodiment of the present invention utilizes a RPF technique to decide whether or not to forward the LSA protocol message over the fast path, even though the LSA protocol message is not a multicast protocol message. Specifically, upon receiving the LSA protocol message from the originating device over the inbound interface, the router determines whether the inbound interface is the preferred inbound interface for the originating device. If the inbound interface is the preferred inbound interface for the originating device, then the router forwards the LSA protocol message over the fast path to all interfaces other than the inbound interface. If the inbound interface is not the preferred inbound interface for the originating device, then the router does not forward the LSA protocol message over the fast path. In either case, the router preferably routes the LSA protocol message to the control plane for local processing of the LSA protocol message.

Figure 7:
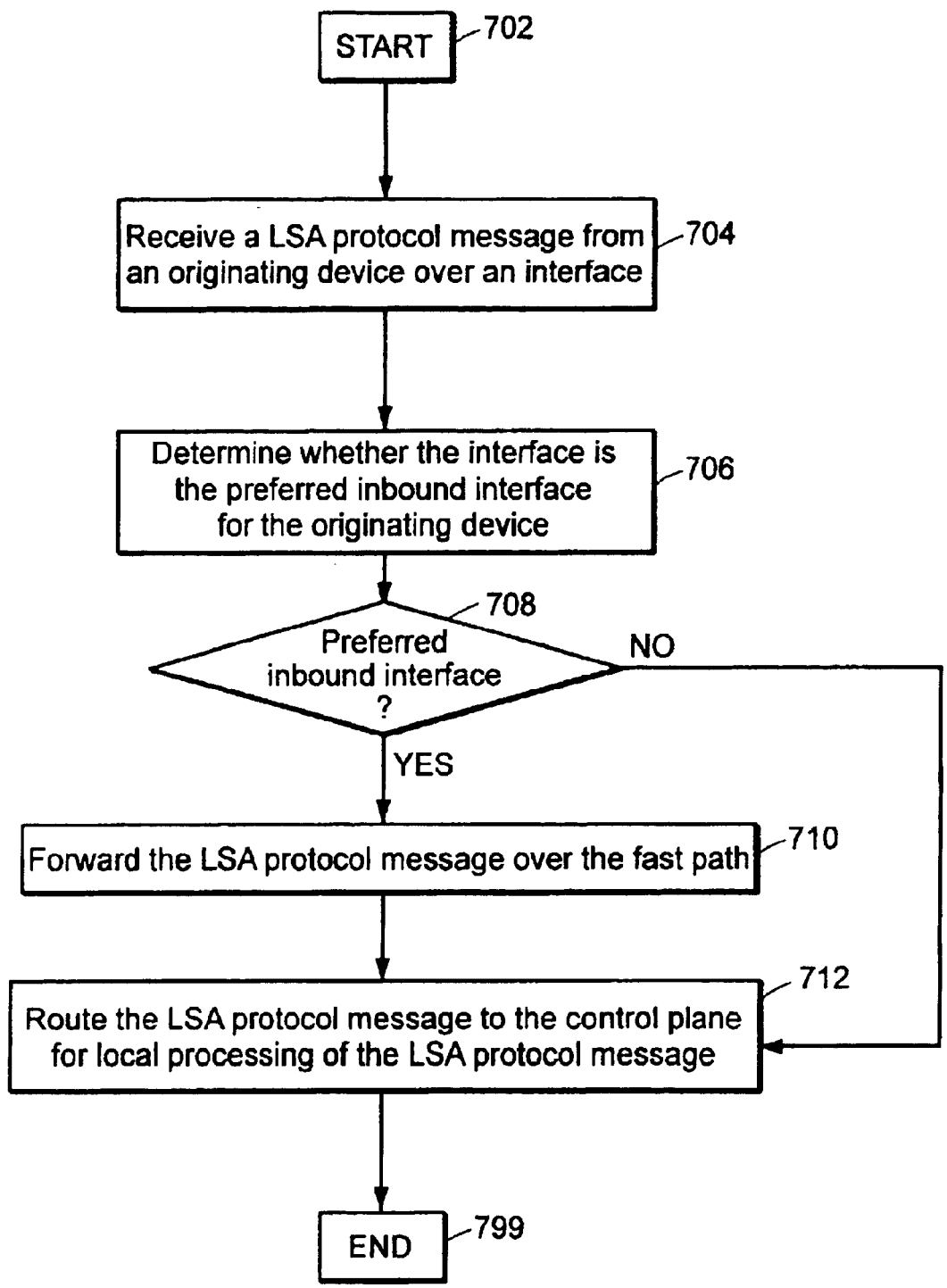
FIG. 7 is a logic flow diagram showing exemplary logic 700 for forwarding a LSA protocol message using a RPF technique.

FIG. 7 is a logic flow diagram showing exemplary logic 700 for forwarding a LSA protocol message using a RPF technique. Beginning at step 702, and upon receiving a LSA protocol message from an originating device over an interface, in step 702, the logic determines whether the interface is the preferred inbound interface for the originating device, in step 706. If the logic determines that the interface is the preferred inbound interface for the originating device (YES in step 708), then the logic forwards the LSA protocol message over the fast path, in step 710. If the logic determines that the interface is not the preferred inbound interface for the originating device (NO in step 708), then the logic does not forward the LSA protocol message over the fast path. In either case, the logic preferably routes the LSA protocol message to the control plane for local processing of the LSA protocol message, in step 712. The logic 700 terminates in step 799.

In one exemplary embodiment of the invention, the router sets up a forwarding state indicating the preferred inbound interface for the originating device, and utilizes the forwarding state to decide whether or not to forward the LSA protocol message over the fast path. Specifically, the first time the router receives a LSA protocol message from a particular originating device, the router performs a RPF check to determine the preferred inbound interface for the originating device, and installs a forwarding state indicating the preferred inbound interface. It should be noted that the RPF check is performed on the Router ID of the LSA protocol message and not on the source address of the LSA protocol message, since the LSA protocol message is propagated hop-by-hop using a common address, and therefore the source address does not identify the originating device. It should also be noted that this embodiment requires the router to maintain a forwarding state for each router from which LSA protocol messages are received.

More specifically, when the router receives a LSA protocol message from the originating device over the interface, the router searches the forwarding table for a corresponding forwarding state. If the router does not find a corresponding forwarding state, indicating the LSA protocol message is the first LSA protocol message received from the originating device, the router routes the LSA protocol message to the control plane. The control plane performs the RPF check to determine the preferred inbound interface for the originating device, and installs the forwarding state indicating the preferred inbound interface.

Once the forwarding state is installed, the router utilizes the forwarding state to determine whether the inbound interface is the preferred inbound interface for the originating device. If the inbound interface is the preferred inbound interface for the originating device, then the router forwards the LSA protocol message over the fast path to all interfaces other than the inbound interface. If the inbound interface is not the preferred inbound interface for the originating device, then the router does not forward the LSA protocol message over the fast path. In either case, the router preferably routes the LSA protocol message to the control path for local processing of the LSA protocol message.

Thereafter, the router utilizes the forwarding state to decide whether or not to forward subsequent LSA protocol messages from the originating device over the fast path.

Specifically, upon receiving a LSA protocol message from the originating device over an interface, the router searches the forwarding table for a corresponding forwarding state indicating the preferred inbound interface for the originating device. Assuming the forwarding state is found, the router determines whether the inbound interface is the preferred inbound interface for the originating device. If the inbound interface is the preferred inbound interface for the originating device, then the router forwards the LSA protocol message over the fast path to all interfaces other than the inbound interface. If the inbound interface is not the preferred inbound interface for the originating device, then the router does not forward the LSA protocol message over the fast path. In either case, the router preferably routes the LSA protocol message to the control path for local processing of the LSA protocol message.

Figure 8:
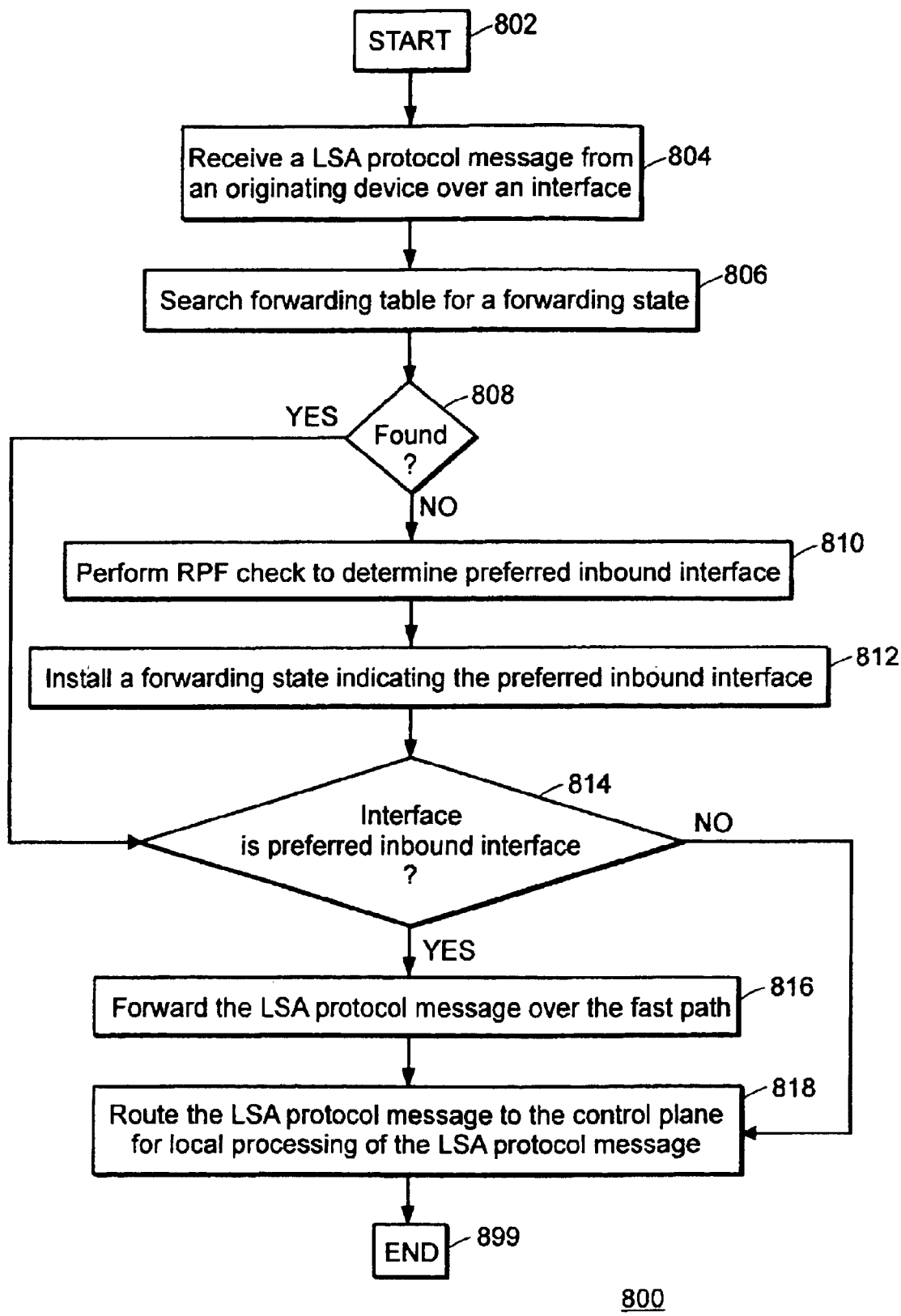
FIG. 8 is a logic flow diagram showing exemplary logic 800 for forwarding a LSA protocol message using a forwarding state.

FIG. 8 is a logic flow diagram showing exemplary logic 800 for forwarding a LSA protocol message using a forwarding state. Beginning at step 802, and upon receiving a LSA protocol message from an originating device over an interface, in step 804, the logic searches the forwarding table for a corresponding forwarding state, in step 806. If the forwarding state is not found (NO in step 808), then the logic performs a RPF check to determine the preferred inbound interface for the originating device, in step 810, and installs a forwarding state indicating the preferred inbound interface, in step 812. If the forwarding state is found (YES in step 808), or once the logic installs a forwarding state, in step 812, the logic determines whether the inbound interface is the preferred inbound interface for the originating device, in step 814. If the logic determines that the interface is the preferred inbound interface for the originating device (YES in step 814), then the logic forwards the LSA protocol message over the fast path, in step 816. If the logic determines that the interface is not the preferred inbound interface for the originating device (NO in step 814), then the logic does not forward the LSA protocol message over the fast path. In either case, the logic preferably routes the LSA protocol message to the control plane for local processing of the LSA protocol message, in step 818. The logic 800 terminates in step 899.

In such an exemplary embodiment of the invention, predominantly all of the logic for forwarding the LSA protocol message is preferably implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

In another exemplary embodiment of the invention, the RPF check is performed for each LSA protocol message by the fast path, preferably using a hardware-based implementation for speed. Specifically, when the router receives a LSA protocol message from an originating device over an interface, the router performs a RPF check to determine whether the inbound interface is the preferred inbound interface. It should be noted that the router only needs to determine whether or not the particular inbound interface is the preferred inbound interface, and does not need to determine the preferred inbound interface in general. If the inbound interface is the preferred inbound interface for the originating device, then the router forwards the LSA protocol message over the fast path to all interfaces other than the inbound interface. If the inbound interface is not the preferred inbound interface for the originating device, then the router does not forward the LSA protocol message over the fast path. In either case, the router preferably routes the LSA protocol message to the control path for local processing of the LSA protocol message.

Figure 9:
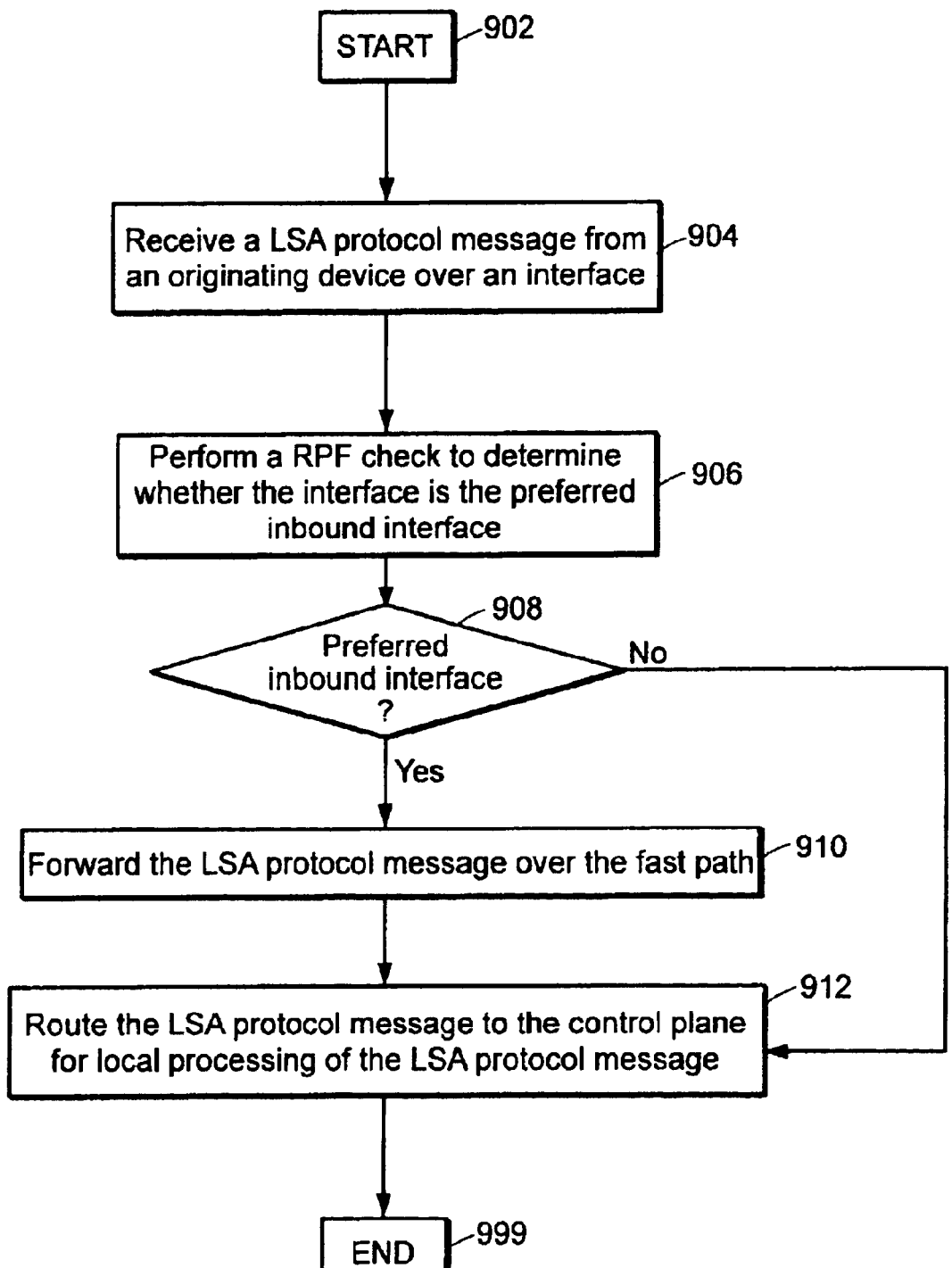
FIG. 9 is a logic flow diagram showing exemplary logic 900 for forwarding a LSA protocol message using a RPF check.

FIG. 9 is a logic flow diagram showing exemplary logic 900 for forwarding a LSA protocol message using a RPF check. Beginning at step 902, and upon receiving a LSA protocol message from an originating device over an interface, in step 904, the logic performs a RPF check on the inbound interface to determine whether the inbound interface is the preferred inbound interface for the originating device, in step 906. If the logic determines that the interface is the preferred inbound interface for the originating device (YES in step 908), then the logic forwards the LSA protocol message over the fast path, in step 910. If the logic determines that the interface is not the preferred inbound interface for the originating device (NO in step 908), then the logic does not forward the LSA protocol message over the fast path. In either case, the logic preferably routes the LSA protocol message to the control plane for local processing of the LSA protocol message, in step 912. The logic 900 terminates in step 999.

Thus, the present invention may be embodied as a method for propagating a link state advertisement protocol message by a network device in a communication network. The network device includes a plurality of interfaces, a fast path for forwarding protocol messages, and a control plane for processing protocol messages. The method involves receiving a link state advertisement protocol message from an originating device over an inbound interface, determining whether the inbound interface is a reverse path forwarding interface for the originating device, and forwarding the link state advertisement protocol message by the fast path, if and only if the inbound interface is determined to be the reverse path forwarding interface for the originating device. Determining whether the inbound interface is the reverse path forwarding interface for the originating device may involve performing a reverse path forwarding check based upon a router identifier in order to determine the reverse path forwarding interface for the originating device and determining whether the inbound interface is the reverse path forwarding interface indicated by the reverse path forwarding check. A forwarding state indicating the reverse path forwarding interface for the originating device may be installed in a forwarding table, in which case determining whether the inbound interface is the reverse path forwarding interface for the originating device may involve searching the forwarding table for the forwarding state and determining whether the inbound interface is the reverse path forwarding interface indicated by the forwarding state. Determining whether the interface is the reverse path forwarding interface for the originating device may involve performing a reverse path forwarding check on the interface based upon a router identifier in order to determine whether the interface is the reverse path forwarding interface for the originating device. The method preferably also involves routing the link state advertisement protocol message to the control plane, processing the link state advertisement protocol message by the control plane, and forwarding the link state advertisement protocol message by the control plane.

The present invention may also be embodied as a device for propagating a link state advertisement protocol message in a communication network. The device includes a plurality of interfaces, a control plane for processing protocol messages, and a fast path coupled to the control plane and to the plurality of interfaces. The fast path includes receiving logic for receiving a link state advertisement protocol message from an originating device over an inbound interface and fast path forwarding logic for forwarding the link state advertisement protocol message if and only if the inbound interface is a reverse path interface for the originating device. The device includes reverse path forwarding logic. The reverse path forwarding logic may be used to determine whether the inbound interface is the reverse path forwarding interface for the originating device, or the reverse path forwarding logic may be used to determine the reverse path forwarding interface for the originating device from among the plurality of interfaces. The device may include a forwarding table as well as forwarding state installation logic for installing a forwarding state in the forwarding table indicating the reverse path forwarding interface for the originating device. Upon receiving the link state advertisement protocol message, the fast path forwarding logic may search the forwarding table to find the forwarding state and forward the link state advertisement protocol message if and only if the inbound interface is the reverse path forwarding interface indicated by the forwarding state. The device typically includes outbound interface determination logic for determining outbound interface(s) for forwarding the link state advertisement protocol message. The fast path forwarding logic typically routes the link state advertisement protocol message to the control plane for local processing of the link state advertisement protocol message.

The present invention may also be embodied as a computer program product for use in a network device having a plurality of interfaces, a control plane for processing protocol messages, and a fast path for forwarding protocol messages. The computer program product includes receiving logic for receiving a link state advertisement protocol message from an originating device over an inbound interface and fast path forwarding logic for forwarding the link state advertisement protocol message if and only if the inbound interface is a reverse path interface for the originating device.

The present invention may be embodied in other specific forms without departing from the essence or essential characteristics. The described embodiments are to be considered in all respects only as illustrative and not restrictive.

I claim:

1. A method for propagating a link state advertisement protocol message by a network device in a communication network, the network device having a plurality of interfaces, a fast path for forwarding protocol messages, and a control plane for processing protocol messages, the method comprising:

receiving a link state advertisement protocol message from an originating device over an inbound interface;

determining whether the inbound interface is a reverse path forwarding interface for the originating device; and forwarding the link state advertisement protocol message by the fast path, if and only if the inbound interface is determined to be the reverse path forwarding interface for the originating device.

2. The method of claim 1, wherein determining whether the interface is the reverse path forwarding interface for the originating device comprises:

performing a reverse path forwarding check to determine the reverse path forwarding interface for the originating device; and determining whether the inbound interface is the reverse path forwarding interface indicated by the reverse path forwarding check.

3. The method of claim 2, wherein performing the reverse path forwarding check comprises:

performing the reverse path forwarding check based upon a router identifier in the link state advertisement protocol message, the router indicator identifying the originating device.

4. The method of claim 2, further comprising:

installing a forwarding state indicating the reverse path forwarding interface for the originating device.

5. The method of claim 1, wherein determining whether the inbound interface is the reverse path forwarding interface for the originating device comprises:

performing a reverse path forwarding check on the inbound interface to determine whether the inbound interface is the reverse path forwarding interface for the originating device.

6. The method of claim 5, wherein performing the reverse path forwarding check comprises:

performing the reverse path forwarding check based upon a router identifier in the link state advertisement protocol message, the router indicator identifying the originating device.

7. The method of claim 1, wherein determining whether the inbound interface is the reverse path forwarding interface for the originating device comprises:

maintaining a number of forwarding states, each forwarding state indicating a reverse path forwarding interface for one of a number of originating devices;

finding a forwarding state for the originating device in the forwarding table; and determining whether the inbound interface is the reverse path forwarding interface indicated by the forwarding state for the originating device.

8. The method of claim 1, further comprising:

routing the link state advertisement protocol message to the control plane; and processing the link state advertisement protocol message by the control plane.

9. The method of claim 8, further comprising:

forwarding the link state advertisement protocol message by the control plane.

10. A device for propagating a link state advertisement protocol message in a communication network, the device comprising:

a plurality of interfaces;

a control plane for processing protocol messages; and a fast path coupled to the control plane and to the plurality of interfaces, the fast path comprising:

receiving logic operably coupled to receive a link state advertisement protocol message from an originating device over an inbound interface; and fast path forwarding logic responsive to the receiving logic and operably coupled to forward the link state advertisement protocol message if and only if the inbound interface is a reverse path interface for the originating device.

11. The device of claim 10, further comprising:

reverse path forwarding logic operably coupled to determine the reverse path forwarding interface for the originating device.

12. The device of claim 11, further comprising:

forwarding state installation logic responsive to the reverse path forwarding logic and operably coupled to install a forwarding state in a forwarding table indicating the reverse path forwarding interface for the originating device.

13. The device of claim 10, wherein the fast path forwarding logic comprises:

reverse path forwarding logic operably coupled to perform a reverse path forwarding check on the inbound interface to determine whether the inbound interface is the reverse path forwarding interface for the originating device.

14. The device of claim 10, wherein the fast path forwarding logic comprises:

outbound interface determination logic operably coupled to determine outbound interface(s) for forwarding the link state advertisement protocol message.

15. The device of claim 10, further comprising a forwarding table having at least one forwarding state indicating the reverse path forwarding interface for the originating device.

16. The device of claim 15, wherein the fast path forwarding logic is operably coupled to forward the link state advertisement protocol message if and only if the inbound interface is the reverse path forwarding interface indicated by said forwarding state.

17. The device of claim 10, wherein the fast path forwarding logic is operably coupled to route the link state advertisement protocol message to the control plane for local processing of the link state advertisement protocol message.

18. The device of claim 17, wherein the control plane is operably coupled to forward the link state advertisement protocol message via the fast path.

19. A program product comprising a computer readable medium having embodied therein a computer program for propagating a link state advertisement protocol message by a network device in a communication network, the network device having a plurality of interfaces, a control plane for processing protocol messages, and a fast path for forwarding protocol messages, the computer program comprising:

receiving logic programmed to receive a link state advertisement protocol message from an originating device over an inbound interface; and fast path forwarding logic responsive to the receiving logic and programmed to forward the link state advertisement protocol message if and only if the inbound interface is a reverse path interface for the originating device.

20. The program product of claim 19, wherein the computer program further comprises:

reverse path forwarding logic programmed to determine the reverse path forwarding interface for the originating device.

21. The program product of claim 20, wherein the computer program further comprises:

forwarding state installation logic responsive to the reverse path forwarding logic and programmed to install a forwarding state in a forwarding table indicating the reverse path forwarding interface for the originating device.

22. The program product of claim 19, wherein the fast path forwarding logic comprises:

reverse path forwarding logic operably coupled to perform a reverse path forwarding check on the inbound interface to determine whether the inbound interface is the reverse path forwarding interface for the originating device.

23. The program product of claim 19, wherein the fast path forwarding logic comprises:

outbound interface determination logic programmed to determine outbound interface(s) for forwarding the link state advertisement protocol message.

24. The program product of claim 19, wherein the network device includes a forwarding table having at least one forwarding state indicating the reverse path forwarding interface for the originating device, and wherein the fast path forwarding logic is programmed to forward the link state advertisement protocol message if and only if the inbound interface is the reverse path forwarding interface indicated by said forwarding state.

25. The program product of claim 19, wherein the fast path forwarding logic is programmed to route the link state advertisement protocol message to the control plane for local processing of the link state advertisement protocol message.

* * * * *